US009979458B1

(12) United States Patent
Sivasivaganesan et al.

(10) Patent No.: US 9,979,458 B1
(45) Date of Patent: May 22, 2018

(54) PRECODER DESIGN FOR COMBINING HIGH-END RF WITH CONSTRAINED RF OF MASSIVE MIMO ANTENNAS

(71) Applicant: Nokia Solutions and Networks Oy, Espoo (FI)

(72) Inventors: Rakesh Sivasivaganesan, Unterhaching (DE); Wolfgang Zirwas, Munich (DE); Berthold Panzner, Holzkirchen (DE); Markus Staudacher, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 27 days.

(21) Appl. No.: 15/355,421

(22) Filed: Nov. 18, 2016

(51) Int. Cl.
*H04B 7/04* (2017.01)
*H04B 7/06* (2006.01)
*H04B 7/024* (2017.01)
*H04W 88/08* (2009.01)

(52) U.S. Cl.
CPC .......... *H04B 7/0634* (2013.01); *H04B 7/024* (2013.01); *H04B 7/0617* (2013.01); *H04W 88/08* (2013.01)

(58) Field of Classification Search
CPC .. H04B 7/0452; H04B 7/0413; H04B 7/0691; H04B 7/0456
See application file for complete search history.

(56) References Cited

U.S. PATENT DOCUMENTS

| 7,400,191 | B2 | 7/2008 | Rodriguez |
| 2007/0247219 | A1 | 10/2007 | Rodriguez |
| 2009/0091384 | A1 | 4/2009 | Sorrells et al. |
| 2010/0173639 | A1 | 7/2010 | Li et al. |
| 2010/0328157 | A1 | 12/2010 | Culkin et al. |
| 2013/0237218 | A1 | 9/2013 | Li et al. |
| 2013/0286960 | A1 | 10/2013 | Li et al. |
| 2014/0113676 | A1 | 4/2014 | Hama[ainen et al. |
| 2014/0203969 | A1 | 7/2014 | Maltsev et al. |
| 2014/0204902 | A1 | 7/2014 | Maltsev et al. |

(Continued)

FOREIGN PATENT DOCUMENTS

WO          99/52311 A1       10/1999

OTHER PUBLICATIONS

M. Joham, W. Utschick and J.A. Nossek, "Linear transmit processing in MIMO communications systems", IEEE Transactions on Signal Processing, vol. 53, No. 8, pp. 2700-2712, Aug. 2005.

(Continued)

*Primary Examiner* — Lakeram Jangbahadur
(74) *Attorney, Agent, or Firm* — Harrington & Smith

(57) ABSTRACT

A method includes mapping a signal desired by at least one receiver to a projection area based at least on a functionality corresponding to one or more first radio frequency chains coupled to a plurality of first antennas; selecting precoding coefficients for at least one of one or more second radio frequency chains coupled to a plurality of second antennas to generate a signal point within the projection area; and compensating for a difference between the generated signal point and the signal desired by the at least one receiver using at least one of the first radio frequency chains, wherein the second radio frequency chains have a reduced functionality relative to the functionality of the first radio frequency chains, and wherein the first and second set of antennas are different.

19 Claims, 8 Drawing Sheets

(56) References Cited

U.S. PATENT DOCUMENTS

| | | | |
|---|---|---|---|
| 2015/0281973 A1* | 10/2015 | Svedman | H04B 7/0691 455/454 |
| 2015/0326285 A1* | 11/2015 | Zirwas | H04B 7/0452 375/267 |
| 2017/0257155 A1* | 9/2017 | Liang | H04B 7/0617 |

OTHER PUBLICATIONS

Larson, Erik G., et al., "Massive MIMO for Next Generation Wireless Systems", IEEE Communications Magazine, vol. 52, No. 2, Feb. 2014, pp. 186-195.

"3rd Generation Partnership Project; Technical Specification Group Radio Access Network; Coordinated multi-point operation for LTE physical layer aspects (Release 11)", 3GPP TR 36.819 V11,0.0, Sep. 2011, 68 pgs.

"3rd Generation Partnership Project; Technical Specification Group Radio Access Network; Evolved Universal Terrestrial Radio Access (E-UTRA); Further advancements fro E-UTRA physical layer aspects (Release 9)", 3GPP TR 36.814 V9.0.0, Mar. 2010, 104 pgs.

Castaneda, Oscar, et al., "1-bit Massive MU-MIMO Precoding in VLSI", arXiv:1702.03449, Feb. 11, 2017, 14 pages.

Jacobsson, Sven, et al., "Quantized Precoding for Massive MU-MIMO", arXiv:1610.07564, Oct. 2016, 30 pages.

Jacobsson, Sven, et al., "Nonlinear 1-Bit Precoding for Massive MU-MIMO with Higher-Order Modulation", in Proc. Asilomar Conf. Signals, Syst., Comput., Nov. 2016, 5 pages.

Jedda, Hela, et al., "Minimum BER Precoding in 1-Bit Massive MIMO Systems", IEEE Sensor Array and Multichannel Signal Process, Workshop (SAM), Jul. 2016, 5 pages.

Staudacher, Markus, et al., "Constructing Receiver Signal Points using Constrained Massive MIMO Arrays", Institute for Communications Engineering, Feb. 8, 2017, 6 pages.

Tirkkonen, Olav, et al., "Subset-Codebook Precoding for 1-bit Massive Multiuser MIMO", in Conference on Information Sciences and Systems, Mar. 2017, 5 pages.

\* cited by examiner

PRECODER DESIGN FOR COMBINING HIGH-END RF WITH CONSTRAINED RF OF MASSIVE MIMO ANTENNAS

TECHNICAL FIELD

This invention relates generally to wireless communication and, more specifically, relates to massive Multiple In Multiple Out (mMIMO) antenna systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Massive MIMO is a technology where the number of terminals is much less than the number of base station (mobile station) antennas, and has been incorporated into wireless broadband standards like LTE and Wi-Fi. Massive MIMO uses a very large number of service antennas (e.g., hundreds or thousands) that are operated fully coherently and adaptively. Extra antennas help by focusing the transmission and reception of signal energy into ever-smaller regions of space. This brings improvements in throughput and energy efficiency, in particular when combined with simultaneous scheduling of a large number of user equipment (e.g., tens or hundreds).

BRIEF SUMMARY

This section is intended to include examples and is not intended to be limiting.

According to one example embodiment, a method comprises mapping a signal desired by at least one receiver to a projection area based at least on a functionality corresponding to one or more first radio frequency chains coupled to a plurality of first antennas; selecting precoding coefficients for at least one of one or more second radio frequency chains coupled to a plurality of second antennas to generate a signal point within the projection area; and compensating for a difference between the generated signal point and the signal desired by the at least one receiver using at least one of the first radio frequency chains, wherein the second radio frequency chains have a reduced functionality relative to the functionality of the first radio frequency chains, and wherein the first and second set of antennas are different.

According to another example embodiment, an apparatus comprises: at least one processor; and at least one memory including computer program code, the at least one memory and the computer program code configured to, with the at least one processor, cause the apparatus to perform at least the following: map a signal desired by at least one receiver to a projection area based at least on a functionality corresponding to one or more first radio frequency chains coupled to a plurality of first antennas; select precoding coefficients for at least one of one or more second radio frequency chains coupled to a plurality of second antennas to generate a signal point within the projection area; and compensate for a difference between the generated signal point and the signal desired by the at least one receiver using at least one of the first radio frequency chains, wherein the second radio frequency chains have a reduced functionality relative to the functionality of the first radio frequency chains, and wherein the first and second set of antennas are different.

According to another example embodiment, a computer program product comprising a non-transitory computer-readable medium storing computer program code thereon which when executed by a device causes the device to perform at least: mapping a signal desired by at least one receiver to a projection area based at least on a functionality corresponding to one or more first radio frequency chains coupled to a plurality of first antennas; selecting precoding coefficients for at least one of one or more second radio frequency chains coupled to a plurality of second antennas to generate a signal point within the projection area; and compensating for a difference between the generated signal point and the signal desired by the at least one receiver using at least one of the first radio frequency chains, wherein the second radio frequency chains have a reduced functionality relative to the functionality of the first radio frequency chains, and wherein the first and second set of antennas are different.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, which is defined by the claims.

The exemplary embodiments herein describe techniques for precoder design for combining high-end RF with constrained RF of massive MIMO antennas. Additional description of these techniques is presented after a system into which the exemplary embodiments may be used is described.

Figure 1:
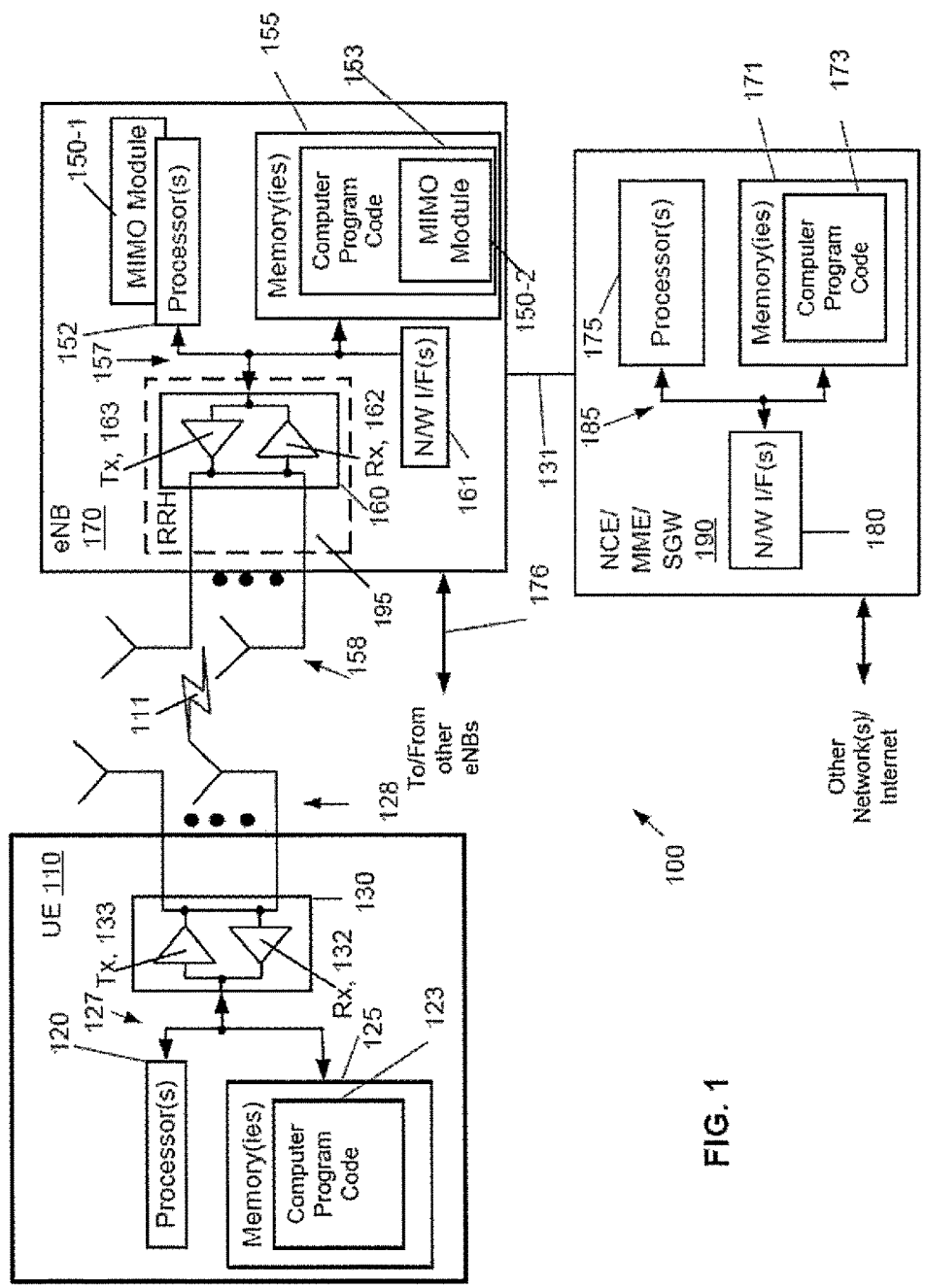
FIG. 1 is a block diagram of one possible and non-limiting exemplary system in which the exemplary embodiments may be practiced.

Turning to FIG. 1, this figure shows a block diagram of an exemplary system in which the exemplary embodiments may be practiced. In FIG. 1, UE 110 is in wireless communication with a wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Each UE 110 communicates with eNB 170 via a wireless link 111, and there are N wireless links shown.

The eNB 170 is a base station that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to multiple (e.g., many) antennas 158. The one or more memories 155 include computer program code 153. The eNB 170 includes a MIMO module 150, comprising one of or both parts 150-1 and/or 150-2, which may be implemented in a number of ways. The MIMO module 150 may be implemented in hardware as MIMO module 150-1, such as being implemented as part of the one or more processors 152. The MIMO module 150-1 may be implemented also as an integrated circuit or through other hardware such as a programmable gate array. In another example, the MIMO module 150 may be implemented as MIMO module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME/SGW functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Exemplary embodiments relate to the addition of massive MEM arrays with constrained RFs to existing antenna arrays with high end RFs in a wireless network, and the distributed implementation of jointly designing the precoders for antenna elements (AEs) connected to constrained RF-chains and high-end RF-chains. As compared to the high-end RF chains, constrained RF-chains may have, for example, digital-to-analog converters (DACs) with limited bit resolution, cheaper amplifiers with a small operating region, and/or relaxed analog filters.

One document that relates to mMIMO is U.S. Pat. No. 9,231,676, which describes combining low cost RF chains and high end RF chains, thus providing a low cost implementation of massive MIMO antenna arrays with potentially hundreds or more antenna elements. The combination of low cost frontends with high accuracy RF chains provides high performance due to the high end RF chains while maintaining low cost due to high number of extremely low cost RF chains.

In the existing network infrastructure, a few high end RFs are already deployed. An mMIMO array with low end RFs may be added to the high end RFs to boost the performance. Such a 'booster' array could be deployed close to the existing infrastructure or mounted on a nearby high-rise building. In any case, in order to perform joint precoding a distributed scheme is necessary with minimal exchange of information between the high end RFs and the constrained RFs. Furthermore, the signal transmitted from the high end RF has very high resolution while the signal transmitted using constrained RF is limited in resolution e.g. 1 bit of amplitude and 3 bits of phase information. In the simplest case with only 1 bit of amplitude, the antenna elements are either switched on or switched off. In order to fully utilize the additional mMIMO array with constrained RFs, the precoder design for the constrained RFs should take into account that the high end RFs can compensate for the limitations in the constrained RFs.

The following document generally relates to precoder design, but only for high end RFs: M. Joham, W. Utschick and J. A. Nossek, "Linear transmit processing in MIMO communications systems," in *IEEE Transactions on Signal Processing*, vol. 53, no. 8, pp. 2700-2712, August 2005.

Embodiments, herein relate to jointly designing the precoder for the constrained and high end RF in a decentralized way.

In general, embodiments described herein iteratively construct a desired signal at the receivers by determining the precoding coefficients for the constrained RFs one after another taking into account at each iterative step that the high end RFs are capable of producing high resolution signals and could compensate for certain errors. For example, first the desired signal may mapped to a signal subspace. Alternatively, an ellipsoid or polytope may be used depending on the transmit power constraint of the high end RFs. The subspace represents the union of the desired signal and all the errors that can be compensated by the high end RFs. Secondly, the constrained RFs' precoding coefficients are used to generate a signal point lying in this subspace. Within this subspace the high end RFs can fully compensate for the difference between the desired signal and the signal point constructed by constrained RFs.

In case there are not a sufficient number of constrained RFs to generate a signal point within this signal subspace (e.g., the number of simultaneously served users is larger than the number of full RFs) then a signal point closest to the signal subspace is generated by the constrained RFs. Furthermore, the order of choosing the precoding coefficients for the constrained RFs influence the resulting error. An exhaustive search can be performed through all the combinations of the constrained RF's AEs to find the best precoding coefficients that minimize the error, but this tends to be computationally expensive. Even in the case of an exhaustive search, it is sufficient to search through only the constrained RFs to find the optimum order because all the high end RFs are taken into account in each step by considering the signal subspace instead of just the desired signal point.

The set of constrained and high end RFs may be either co-located or distributed. For example, the high end RFs may be placed at typical macro sites, while the constrained RF panels may be placed somewhere within the cell, e.g., similar to how small cells are placed. In addition to proper synchronization for the case of backhaul delays, it may be necessary to coordinate the independently running precoding algorithms for the high end and the constrained RFs, i.e., to exchange information about the achievable subspace region of the high end RF AEs, defined, e.g., by the maximum full RE power, and vice versa to inform the precoder at the high end RF site about the precoding strategy being used to reach the subspace or to get close to the subspace. This information may be exchanged over the X2 interface for proper precoder alignment to allow for a distributed simultaneous calculation of the precoder weights.

In some examples, the high end RFs may share channel coefficients to the constrained RFs through, e.g., the X2 interface. The constrained RFs may then determine their precoding coefficients based on this information. Afterwards, the constrained RFs may communicate the error or difference in signal that the high end RFs need to compensate for. In some embodiments, the constrained RFs could communicate the error to the desired signal that the high end RFs need to use, while other embodiments communicate the optimum precoder coefficients.

Figure 2:
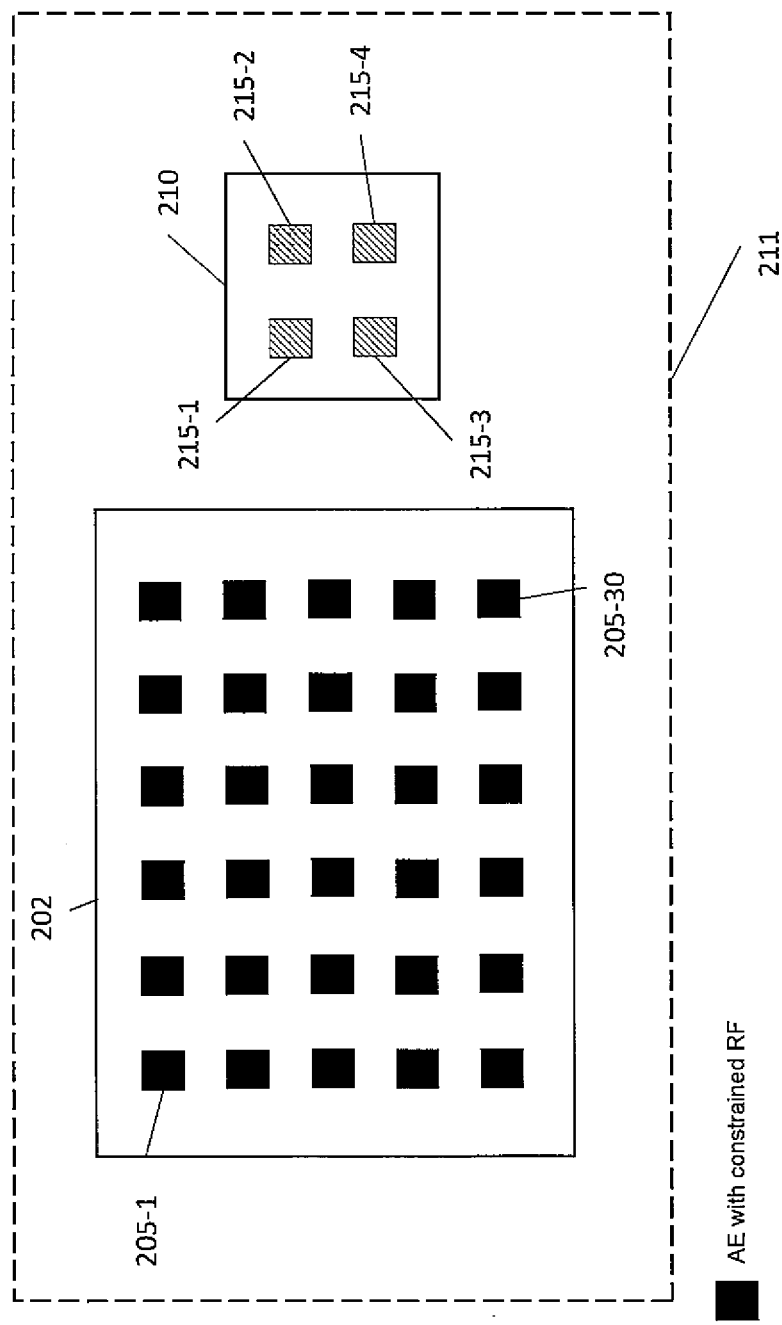
FIG. 2 shows an example antenna concept including an antenna array having antenna elements having high end RF chains, and an antenna array having antenna elements having constrained RF chains.

Referring now to FIG. 2, this figure shows an example first antenna array 202 having constrained antenna elements (AE) and an example second antenna array 210 having high end AEs in accordance with exemplary embodiments.

As illustrated by FIG. 2, there are thirty antenna elements 205-1 through 205-30 (i.e., a 5×6 array of antennas in this example) for the first antenna array 202, and four AEs 215-1 through 215-4 (i.e., a 2×2 array of antennas in this example) for the first antenna array 202. In FIG. 2, the antenna arrays 202 and 210 may be located at different locations, for example, at different base stations. However, it is noted that the antenna array may also be collocated as shown by antenna array 211 for example. It is noted that the number of AEs in the example shown in FIG. 2 is not intended to be limiting, and more or less AEs may be used. Herein, the antenna elements are also referred to as antennas (e.g., each antenna element is an antenna), and any antenna configuration for such antenna elements may be used. FIG. 2 also indicates that antenna elements 205-1 to 205-30 are connected to constrained RF chains, and that the antenna elements of antenna array 210 are connected to four high end RF chains 215-1 through 215-4. Embodiments discussed herein provide an optimal way of integrating the high end RF chains into any algorithm that determines the preceding coefficients of the constrained RF chains.

The benefits of the proposed concept are a very high performance in terms of number of served users as well as the residual mean squared error (MSE), even in case of a very limited number of high end RF frontends. One application could be to use the high end RFs from an available macro site having, for example, just 4 RF front ends as shown in FIG. 2, and adding a low cost constrained RF panel directly at the site or somewhere in the cell. In such an example configuration up to ten user equipment could be served. In addition the Knapsack algorithm as well as the subspace approach will lead to limited processing overhead.

The concept of over the air signal generation aims at transmitting signals from antenna elements such that when multiplied by the channel response, they result in the desired signal at the receiver (Quadrature Amplitude Modulation (QAM) symbols or time samples of OFDM symbol). In case of multiple receivers, the desired signals need to be generated simultaneously at all the receivers, and each receiver may have multiple antenna elements. Cascading the signal samples from all the AEs of all the UEs at any particular time instant may be represented by a combined signal (vector) of dimension n. In an n-dimensional signal space this combined signal is denoted by a point. Switching on any one of the AE results in a signal point in this n-dimensional space, which corresponds to the channel response at that time instant.

Figure 3B:
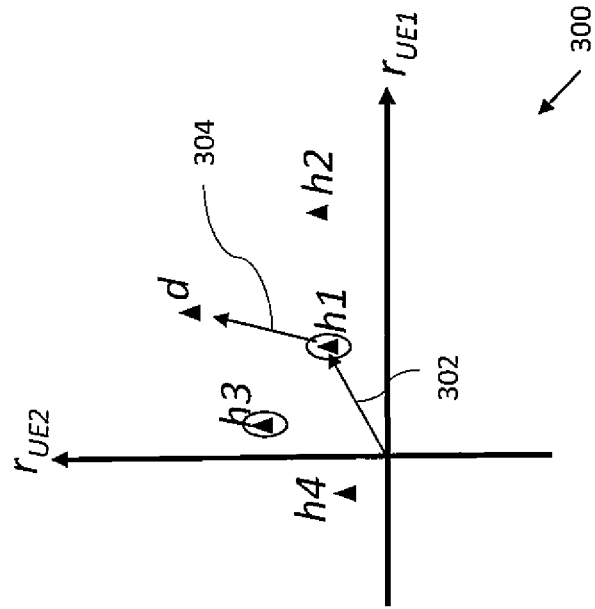
FIG. 3A-3E show example signal spaces in accordance with exemplary embodiments.
Figure 3A:
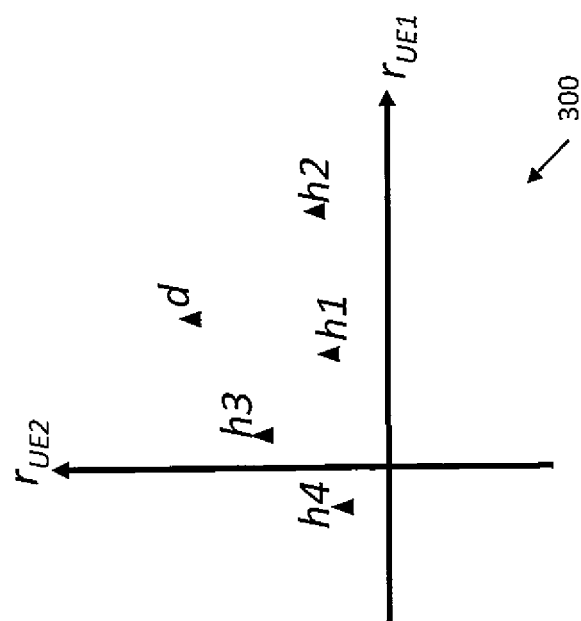

Referring now to FIGS. 3A and 3B, these figures shows example signal spaces in accordance with exemplary embodiments. In FIG. 3A, a signal space 300 of received signals for a transmitter with 3 constrained RFs and one high end RF and 2 single antennas UEs. The x- and y-axis represent the signal received at UE1 and UE2, respectively. The channel seen by the constrained RFs is represented as h1, h2, and h3; the channel seen by the high end RF is represented as h4; and the desired signal point is denoted d. In the following description of FIGS. 3A and 3B, the constrained RFs h1, h2, and h3 are assumed to have one bit resolution (i.e. antenna elements connected with constrained RFs are either switched on or switched off). In this example, h1 to h4 correspond to AE 1 to AE 4. However, this example description can be directly extended to multi-bit amplitude and phase. Referring now to FIG. 3B, in the absence of the high end RF h4, exhaustive search will switch on AE 1 and 3 (represented by the circles surrounding h1 and h3 respectively) to construct a signal as close as possible to d. As can be seen, the vector 302 and the vector 304 correspond to h1 and h3, respectively in this example.

Figure 3C:
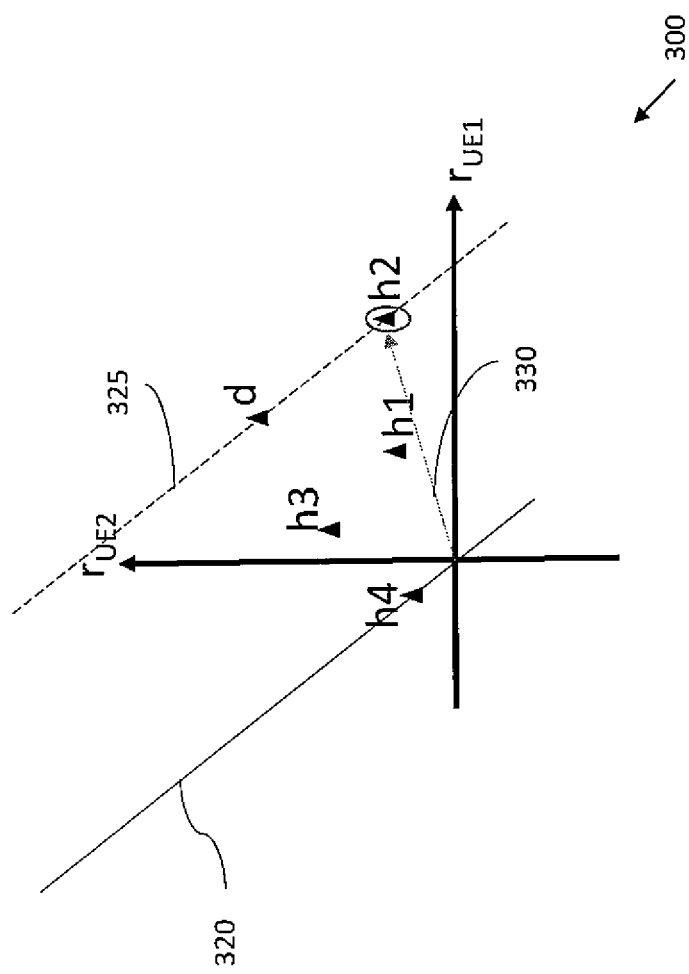

Referring now to FIG. 3C, this figure shows example signal space 300 and amplitude values that can be constructed at the receiver when a high end RF is present. In this example, the high end RF corresponds to point h4. In FIG. 3C, the amplitude values that can be constructed at the high end RF are represented by line 320 through the origin of the signal space 300. The length of the line 320 varies depending on the transmit power constraint for this AE. The dotted line 325 in FIG. 3C shows the line 320 shifted to desired signal point d. The dotted line 325 represents the errors that can be corrected by the high end RF h4. Since from any point on this line 325, the desired signal point d can be reached by using the high end RE, it is sufficient for the constrained RFs during each iteration to switch on the AE that will result in a point close to the line. In this example, the AE 2 is switched on as shown by vector 330.

Figure 3E:
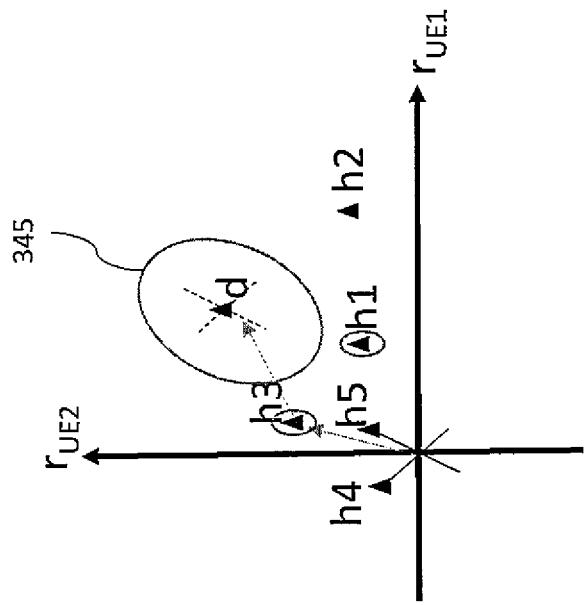
Figure 3D:
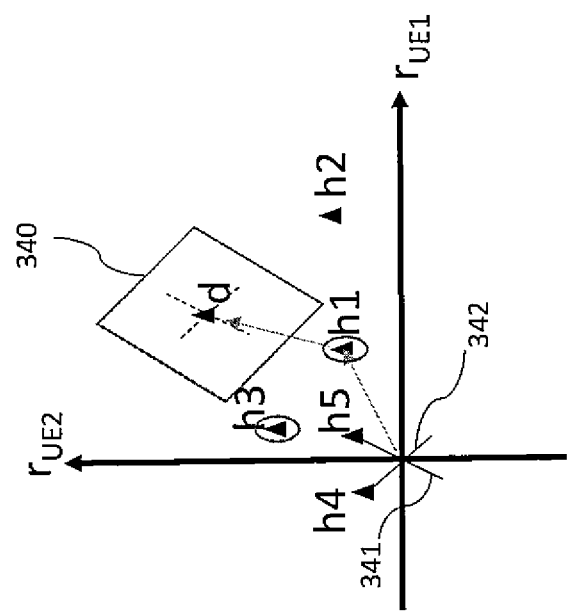

In general, a few number of amplitude and phase bits can be transmitted from each constrained RF AE and hence, the points h1, h2, and h3 can be scaled by a discrete complex value to construct d. Furthermore, there can be more than one high end RFs. In case of two high end RFs, the line 320 in FIG. 3C would be a parallelogram or ellipse for case the AEs have individual or total power constraints, respectively. An example with two AEs namely, AE 4 and AE 5 each connected to one high end RF is shown in FIG. 3D and FIG. 3E for individual and total power constraints, respectively. The points h4 and h5 in FIGS. 3D and 3E correspond to AE 4 and AE 5 respectively. The size of the parallelogram 340 shown in FIG. 3D and the size of the size of the ellipse 345 shown in FIG. 3E are proportional to the power available at the transmitter. The length of the sides of the parallelogram 340 which are parallel to line 341 are proportional to the individual transmit power of AE 5, and the length of the sides of the parallelogram 340 that are parallel to line 342 are proportional to the individual transmit power of AE 4. The size of the ellipse 345 shown in FIG. 3E is proportional to the total transmit power of AE 4 and AE 5. Without the transmit power constraint (i.e. with infinite power) the projection area will be the complete two dimensional subspace spanned by the signal received at UE1 and UE2.

One example implementation of the determination of the order in which the constrained RFs precoders are chosen is based on the following iterative process: out of all available constrained RFs' AE, at each step, precoding coefficients corresponding to one AE are determined such that the chosen AE together with all the previously chosen AE's precoding coefficients the error is minimized between the desired signal subspace and the signal generated at the receiver. This is commonly referred to as the Knapsack algorithm, where the best order out of many combinations is found. According to exemplary embodiments, each search step further includes accounting for the fact that the high end RFs can be used to produce high resolution signals to compensate for the difference between the desired signal, d, and the signal generated over the air using the constrained RFs. It is noted that the Knapsack algorithm is suboptimal as it looks for the best AE in each step sequentially; whereas combining the high end RF is optimal as the influence of all the high end RFs are taken into account in each step.

Figure 4:
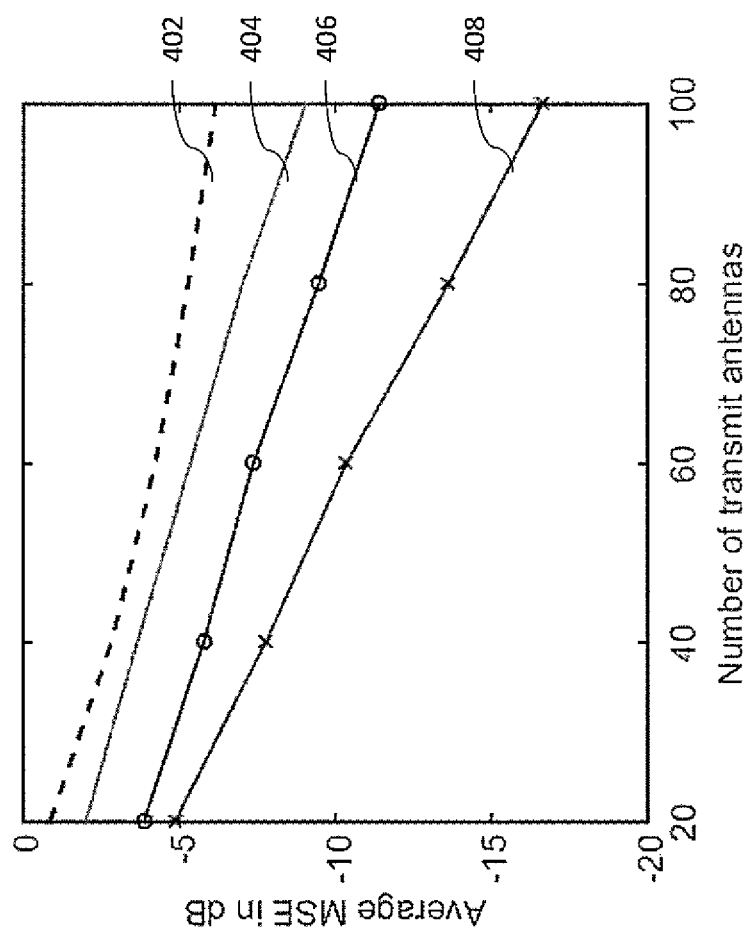
FIG. 4 is a graph of mean squared error (MSE) as a function of increasing the number of constrained RFs in accordance with exemplary embodiments.

Referring now to FIG. 4, this figure shows MSE as a function of increasing the number of constrained RFs in accordance with exemplary embodiments. MSE performance according to exemplary embodiments described herein is indicated by line 408 for the case of 10 UEs served by a base station with 4 high end RFs and varying number of constrained RFs. The line 404 shows the case where only the constrained RFs is used and the AEs are chosen based on knapsack (KS) algorithm. Line 406 shows the MSE for the case where first the AE with constrained RFs are chosen based on KS and then the high end RFs are used to minimize the remaining MSE in a single step. Line 402 shows the algorithm where the ZF coefficients are quantized for the constrained RFs (e.g. as described in U.S. Pat. No. 9,231, 676). It can be seen that line 408 shows an 11 dB better performance than line 402 corresponding to the reference algorithm when 96 constrained RFs and 4 high end RFs are utilized. It is noted that no power constraint has been considered in FIG. 4 with respect to line 402.

Figure 5:
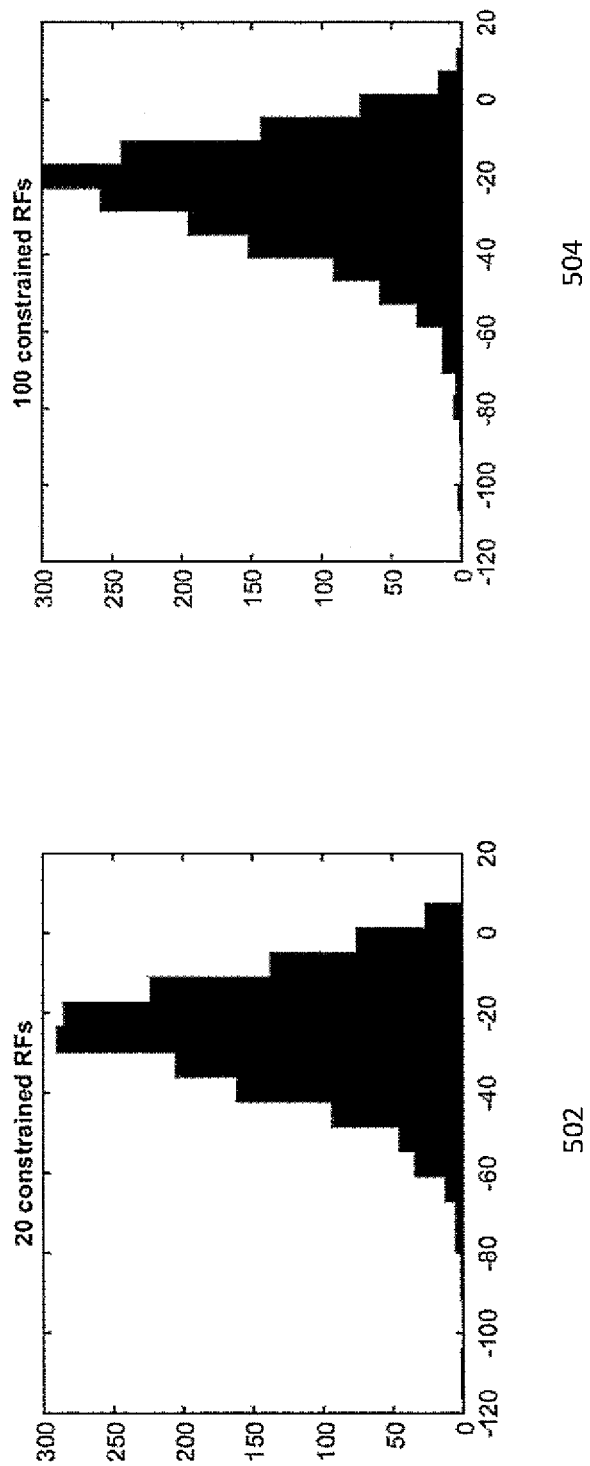
FIG. 5 shows two bar graphs showing distribution of transmit power for high end RFs in dBW in accordance with exemplary embodiments.

Referring now to FIG. 5, this figure shows two bar graphs showing distribution of transmit power for high end RFs in dBW in accordance with exemplary embodiments. The first bar graph 502 is for 20 constrained RFs and the second graph 504 is for 100 constrained RFs. In each of the graphs 502, 504 in FIG. 5, 0 dBW corresponds to maximum transmit power per AE. It can be seen that for most of the cases the transmit power constraint is satisfied automatically.

Grouping the high end RFs together and representing their signal space at the receiver in the form of a subspace provides opportunity to group the AEs of constrained RFs into capacity providing AEs and energy saving AEs: The capacity providing AEs may corresponds to AEs whose instantaneous channel coefficients help in moving towards the high end RF subspace during the iterative steps. The energy saving AEs are the AEs whose instantaneous channel coefficients help in moving within the high end RF subspace there by reducing the power required by the high end RFs. The coefficients of the different groups can be weighted differently in order to either save energy of the high end RFs or increase the capacity of the system. Furthermore, this grouping could be used to reduce the computational complexity by choosing the AEs in each group after the other group AEs. E.g. if the base station is operating in energy saving mode, then the energy saving AEs are designed first and then the capacity providing RFs. For the capacity maximization mode, the order is reversed. In capacity maximization mode, the channel coefficients from the energy saving AEs could be updated less often than that of other AEs, which can be triggered by the base station.

Alternatively, one can use a weighted optimization criterion in each iteration of the Knapsack algorithm so that capacity and power saving are balanced constantly and all antenna elements can be used all the time.

Figure 6:
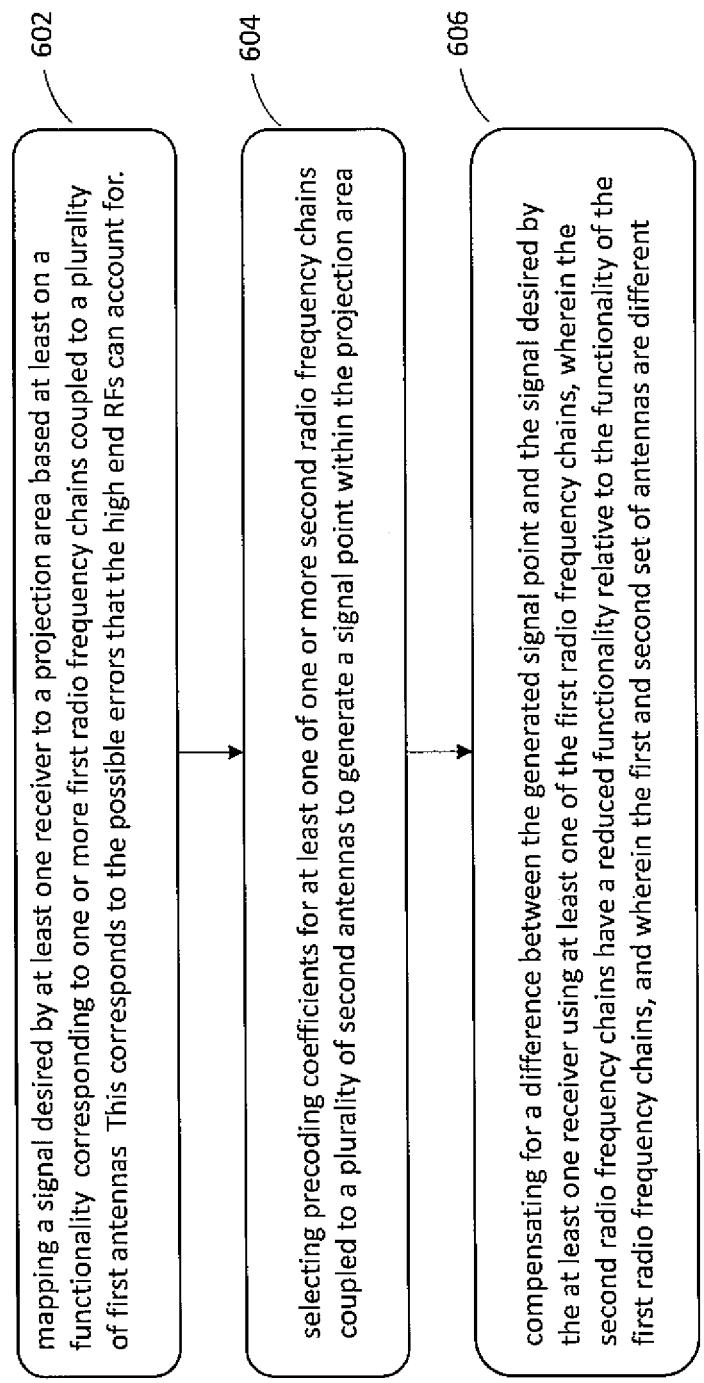
FIG. 6 is a logic flow diagram for precoder design for combining high-end RF with constrained RF of massive MIMO antennas, and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 6 is a logic flow diagram for precoder design for combining high-end RF with constrained RF of massive MIMO antennas. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the MIMO module 150 may include multiples ones of the blocks in FIG. 6, where each included block is an interconnected means for performing the function in the block. The blocks in FIG. 6 are assumed to be performed by a base station such as eNB 170, e.g., under control of the MIMO module 150 at least in part.

With reference to FIG. 6, in one example embodiment a method may comprise: mapping a signal desired by at least one receiver to a projection area based at least on a functionality corresponding to one or more first radio frequency chains coupled to a plurality of first antennas as indicated by block 602; selecting precoding coefficients for at least one of one or more second radio frequency chains coupled to a plurality of second antennas to generate a signal point within the projection area as indicated by block 604; and compensating for a difference between the generated signal point and the signal desired by the at least one receiver using at least one of the first radio frequency chains, wherein the second radio frequency chains have a reduced functionality relative to the functionality of the first radio frequency chains, and wherein the first and second set of antennas are different as indicated by block 606.

For the case the one or more second radio frequency chains are not capable of generating a signal point within the projection area, selecting the precoding coefficients may include: selecting precoding coefficients for at least one of the second radio frequency chains for generating a signal point closest to the projection area. The first antennas and the second antennas may be collocated. The first antennas may be in a different location than the second antennas. The first antennas may be located at a first base station and the second antennas may be located at a second base station, and the first base station may provide a larger cell than the second base station. The method may include receiving, from the first base station via an X2 interface, configuration information for the one or more first radio frequency chains for mapping the desired signal to the projection area. The method may include receiving, from the second base station via an X2 interface, information for determining the difference between the generated signal point and the signal desired for compensating for the difference. The functionality of the first radio frequency chains may be based at least in part on a plurality of features and the second radio frequency chains may have a reduced functionality because one or more features for the second radio frequency chains are relaxed relative to identical one or more features for the first radio frequency chains. The features may correspond to at least one of: transmission power, amplifier character like operating region, bit resolution, and analog filters. A shape of the projection area may be based on at least one of: the number of first radio frequency chains, a total power constraint of the one or more antenna elements, individual power constraints of each of the one or more antenna elements, and the channel coefficient of each of the one or more antenna elements; and a size of the projection area may be based on at least one of: a total power constraint of the one or more antenna elements, and individual power constraints of each of the one or more antenna elements, the channel coefficient of each of the one or more antenna elements. The shape of the projection area may be at least one of: a subspace, an ellipsoid, and a polytope.

According to another example embodiment, an apparatus may comprise at least one processor; and at least one memory including computer program code, the at least one memory and the computer program code configured to, with the at least one processor, cause the apparatus to perform at least the following: map a signal desired by at least one receiver to a projection area based at least on a functionality corresponding to one or more first radio frequency chains coupled to a plurality of first antennas; select precoding coefficients for at least one of one or more second radio frequency chains coupled to a plurality of second antennas to generate a signal point within the projection area; and compensate for a difference between the generated signal point and the signal desired by the at least one receiver using at least one of the first radio frequency chains, wherein the second radio frequency chains have a reduced functionality relative to the functionality of the first radio frequency chains, and wherein the first and second set of antennas are different.

For case the one or more second radio frequency chains are not capable of generating a signal point within the projection area, selection of the precoding coefficients may include: selecting precoding coefficients for at least one of the second radio frequency chains for generating a signal point closest to the projection area. The first antennas and the second antennas may be collocated. The apparatus may be a base station and may further comprise at least one of: the first antennas and the second antennas. At least one of the first antennas and the second antennas may be located at another base station. The at least one memory and the computer program code may be configured to, with the at least one processor, cause the apparatus to perform: receiving, from the first base station via an X2 interface, configuration information for the one or more first radio frequency chains for mapping the desired signal to the projection area. The at least one memory and the computer program code may be configured to, with the at least one processor, cause the apparatus to perform: receive, from the second base station via an X2 interface, information for determining the difference between the generated signal point and the signal desired for compensating for the difference. The functionality of the first radio frequency chains may be based at least in part on a plurality of features and wherein the second radio frequency chains may have a reduced functionality because one or more features for the second radio frequency chains are relaxed relative to identical one or more features for the first radio frequency chains. The features may correspond to at least one of: transmission power, amplifier character like operating region, bit resolution, and analog filters.

According to another embodiment, a computer program product may comprise a non-transitory computer-readable medium storing computer program code thereon which when executed by a device causes the device to perform at least: mapping a signal desired by at least one receiver to a projection area based at least on a functionality corresponding to one or more first radio frequency chains coupled to a plurality of first antennas; selecting precoding coefficients for at least one of one or more second radio frequency chains coupled to a plurality of second antennas to generate a signal point within the projection area; and compensating for a difference between the generated signal point and the signal desired by the at least one receiver using at least one of the first radio frequency chains, wherein the second radio frequency chains have a reduced functionality relative to the functionality of the first radio frequency chains, and wherein the first and second set of antennas are different.

Without in any way limiting the scope, interpretation, or application of the claims appearing below, a technical effect of one or more of the example embodiments disclosed herein is 10 UEs can be supported using only 4 high end RFs and MSE up to −17 dB is achievable with 96 constrained RFs. Another technical effect of one or more of the example embodiments disclosed herein is, in comparison to having only constrained RFs, few high end RFs with high precision helps in achieving minimizing the error to a large extent. Another technical effect of one or more of the example embodiments disclosed herein is, in comparison to having only Full RF, now less power will be necessary due to the diversity gain introduced due to the constrained RF chain AEs. Another technical effect of one or more of the example embodiments disclosed herein is different power constraints namely, maximum power constraint or total power constraint can be addressed. Depending on the power constraint the projection area where the desired signal is projected will change. The proposed invention can be used in all these cases.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

eNB (or eNodeB) evolved Node B (e.g., an LTE base station)
   ADC analog-to-digital converter
   AE antenna element
   I/F interface
   LTE long term evolution
   MIMO multiple input multiple output
   MME mobility management entity
   NCE network control element
   N/W network
   RF-Chain radio frequency chain
   RRH remote radio head
   Rx receiver
   SGW serving gateway
   Tx transmitter
   UE user equipment (e.g., a wireless, typically mobile device)

What is claimed is:

1. A method comprising:
    mapping a signal desired by at least one receiver to a projection area based at least on a functionality corresponding to one or more first radio frequency chains coupled to a plurality of first antennas;
    selecting precoding coefficients for at least one of one or more second radio frequency chains coupled to a plurality of second antennas to generate a signal point within the projection area; and
    compensating for a difference between the generated signal point and the signal desired by the at least one receiver using at least one of the first radio frequency chains, wherein:
        the second radio frequency chains have a reduced functionality relative to the functionality of the first radio frequency chains, and wherein the first and second set of antennas are different;
        the functionality of the first radio frequency chains is based at least in part on a plurality of features corresponding to at least one of: transmission power, amplifier operating region, bit resolution, and analog filters;
        the second radio frequency chains have a reduced functionality because one or more features for the second radio frequency chains are relaxed relative to identical one or more features for the first radio frequency chains;
        a shape of the projection area is based on at least one of: the number of first radio frequency chains, a total power constraint of the one or more antenna elements, individual power constraints of each of the one or more antenna elements, and the channel coefficient of each of the one or more antenna elements; and
    a size of the projection area is based on at least one of: a total power constraint of the one or more antenna elements, and individual power constraints of each of the one or more antenna elements, and the channel coefficient of each of the one or more antenna elements.

2. The method of claim 1, for the case the one or more second radio frequency chains are not capable of generating a signal point within the projection area, selecting the precoding coefficients comprises:
    selecting precoding coefficients for at least one of the second radio frequency chains for generating a signal point closest to the projection area.

3. The method of claim 1, wherein the first antennas and the second antennas are collocated.

4. The method of claim 1, wherein the first antennas are in a different location than the second antennas.

5. The method of claim 4, wherein the first antennas are located at a first base station and the second antennas are located at a second base station, and wherein the first base station provides a larger cell than the second base station.

6. The method of claim 4, the method further comprising one of:
receiving, from the first base station via an X2 interface, configuration information for the one or more first radio frequency chains for mapping the desired signal to the projection area; and
receiving, from the second base station via an X2 interface, information for determining the difference between the generated signal point and the signal desired for compensating for the difference.

7. The method claim 1, wherein the shape of the projection area is at least one of: a subspace, an ellipsoid, and a polytope.

8. An apparatus comprising:
at least one processor; and
at least one memory including computer program code, the at least one memory and the computer program code configured to, with the at least one processor, cause the apparatus to perform at least the following:
map a signal desired by at least one receiver to a projection area based at least on a functionality corresponding to one or more first radio frequency chains coupled to a plurality of first antennas;
select precoding coefficients for at least one of one or more second radio frequency chains coupled to a plurality of second antennas to generate a signal point within the projection area; and
compensate for a difference between the generated signal point and the signal desired by the at least one receiver using at least one of the first radio frequency chains, wherein:
the second radio frequency chains have a reduced functionality relative to the functionality of the first radio frequency chains, and wherein the first and second set of antennas are different;
the functionality of the first radio frequency chains is based at least in part on a plurality of features corresponding to at least one of: transmission power, amplifier operating region, bit resolution, and analog filters;
the second radio frequency chains have a reduced functionality because one or more features for the second radio frequency chains are relaxed relative to identical one or more features for the first radio frequency chains;
a shape of the projection area is based on at least one of: the number of first radio frequency chains, a total power constraint of the one or more antenna elements, individual power constraints of each of the one or more antenna elements, and the channel coefficient of each of the one or more antenna elements; and
a size of the projection area is based on at least one of: a total power constraint of the one or more antenna elements, and individual power constraints of each of the one or more antenna elements, and the channel coefficient of each of the one or more antenna elements.

9. The apparatus of claim 8, wherein for the case the one or more second radio frequency chains are not capable of generating a signal point within the projection area, selection of the precoding coefficients comprises:
selecting precoding coefficients for at least one of the second radio frequency chains for generating a signal point closest to the projection area.

10. The apparatus of claim 8, wherein the first antennas and the second antennas are collocated.

11. The apparatus of claim 8, wherein the apparatus is a first base station and further comprises one of: the first antennas and the second antennas.

12. The apparatus of claim 11, wherein the other one of the first antennas and the second antennas is located at a second base station.

13. The apparatus of claim 12, wherein the at least one memory and the computer program code are configured to, with the at least one processor, cause the apparatus to perform one of the following:
receive, from the first base station via an X2 interface, configuration information for the one or more first radio frequency chains for mapping the desired signal to the projection area; and
receive, from the second base station via an X2 interface, information for determining the difference between the generated signal point and the signal desired for compensating for the difference.

14. The apparatus of claim 8, wherein the shape of the projection area is at least one of: a subspace, an ellipsoid, and a polytope.

15. A computer program product comprising a non-transitory computer-readable medium storing computer program code thereon which when executed by a device causes the device to perform at least:
mapping a signal desired by at least one receiver to a projection area based at least on a functionality corresponding to one or more first radio frequency chains coupled to a plurality of first antennas;
selecting precoding coefficients for at least one of one or more second radio frequency chains coupled to a plurality of second antennas to generate a signal point within the projection area; and
compensating for a difference between the generated signal point and the signal desired by the at least one receiver using at least one of the first radio frequency chains, wherein:
the second radio frequency chains have a reduced functionality relative to the functionality of the first radio frequency chains, and wherein the first and second set of antennas are different;
the functionality of the first radio frequency chains is based at least in part on a plurality of features corresponding to at least one of: transmission power, amplifier operating region, bit resolution, and analog filters;
the second radio frequency chains have a reduced functionality because one or more features for the second radio frequency chains are relaxed relative to identical one or more features for the first radio frequency chains;
a shape of the projection area is based on at least one of: the number of first radio frequency chains, a total power constraint of the one or more antenna elements, individual power constraints of each of the one or more antenna elements, and the channel coefficient of each of the one or more antenna elements; and
a size of the projection area is based on at least one of: a total power constraint of the one or more antenna elements, and individual power constraints of each of the one or more antenna elements, and the channel coefficient of each of the one or more antenna elements.

16. The computer program product of claim 15, wherein, for the case the one or more second radio frequency chains are not capable of generating a signal point within the projection area, selecting the precoding coefficients comprises:
   selecting precoding coefficients for at least one of the second radio frequency chains for generating a signal point closest to the projection area.

17. The computer program product of claim 15, wherein the first antennas and the second antennas are collocated.

18. The computer program product of claim 15, wherein the first antennas are in a different location than the second antennas.

19. The computer program product of claim 15, wherein the first antennas are located at a first base station and the second antennas are located at a second base station, and wherein the first base station provides a larger cell than the second base station.

* * * * *